(12) United States Patent
Okura et al.

(10) Patent No.: US 8,876,301 B2
(45) Date of Patent: Nov. 4, 2014

(54) VIDEO PROJECTION DEVICE EASY FOR ADJUSTMENT WORK

(75) Inventors: Kenichiro Okura, Tokyo (JP); Haruhiko Matoba, Tokyo (JP); Kohei Eto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 74 days.

(21) Appl. No.: 13/603,012

(22) Filed: Sep. 4, 2012

(65) Prior Publication Data

US 2013/0215398 A1 Aug. 22, 2013

(30) Foreign Application Priority Data

Feb. 21, 2012 (JP) ................. 2012-034600

(51) Int. Cl.
*G03B 21/22* (2006.01)
(52) U.S. Cl.
USPC .......................................................... 353/74
(58) Field of Classification Search
CPC ...... G03B 21/10; G03B 21/28; G03B 21/142; G03B 21/145; H04N 9/3185; H04N 3/22
USPC ........................ 353/74, 78, 119; 348/739–771
See application file for complete search history.

(56) References Cited

U.S. PATENT DOCUMENTS

| | | | |
|---|---|---|---|
| 5,741,057 A * | 4/1998 | Goldberg et al. | 353/74 |
| 6,039,912 A * | 3/2000 | Ohira et al. | 264/328.1 |
| 2006/0274283 A1 * | 12/2006 | Lin et al. | 353/74 |
| 2007/0183032 A1 * | 8/2007 | Michimori et al. | 359/443 |
| 2010/0315606 A1 * | 12/2010 | Morikuni et al. | 353/99 |
| 2010/0328622 A1 * | 12/2010 | Watanabe et al. | 353/77 |

FOREIGN PATENT DOCUMENTS

JP 2011-7940 A 1/2011

* cited by examiner

*Primary Examiner* — Thanh Luu
*Assistant Examiner* — Danell L Owens
(74) *Attorney, Agent, or Firm* — Birch, Stewart, Kolasch & Birch, LLP

(57) ABSTRACT

A video projection device includes an optical engine, a projection lens, a reflection mirror, a non-spherical mirror, a screen, and a cabinet which covers the lower surface and the back surface of the screen. The projection lens and the non-spherical mirror are placed at an approximate center in the leftward and rightward directions of the screen and at a back portion within the cabinet. The reflection mirror is placed at an approximate center in the leftward and rightward directions of the screen and at a front portion within the cabinet. The video projection device further includes projection-unit structural members for integrally coupling the projection lens, the reflection mirror and the non-spherical mirror to each other, thereby forming a projection unit.

7 Claims, 14 Drawing Sheets

F I G. 9
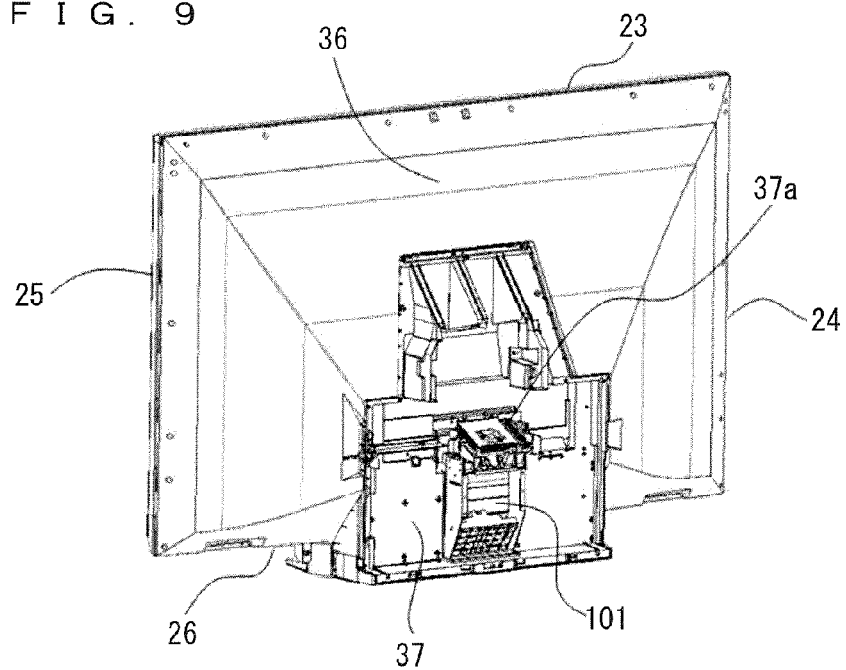
F I G. 10
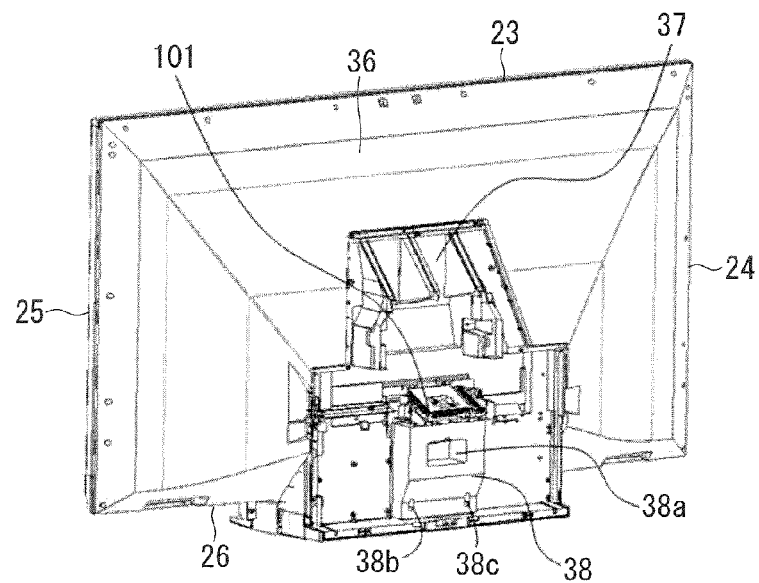

F I G. 1 5
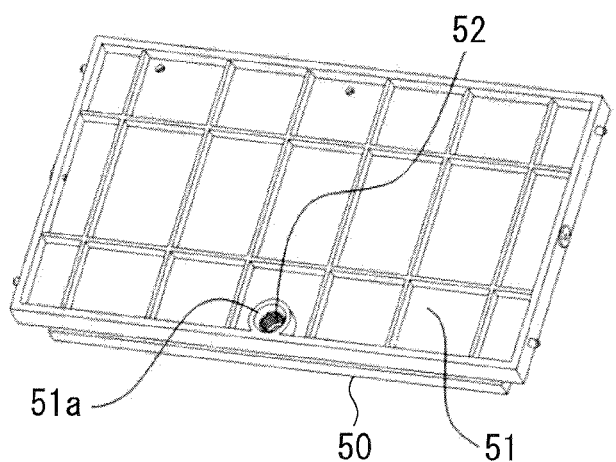
F I G. 1 6
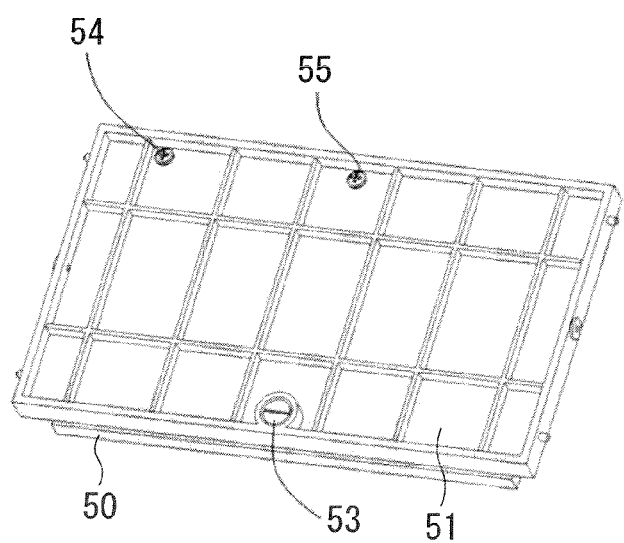

F I G. 2 2
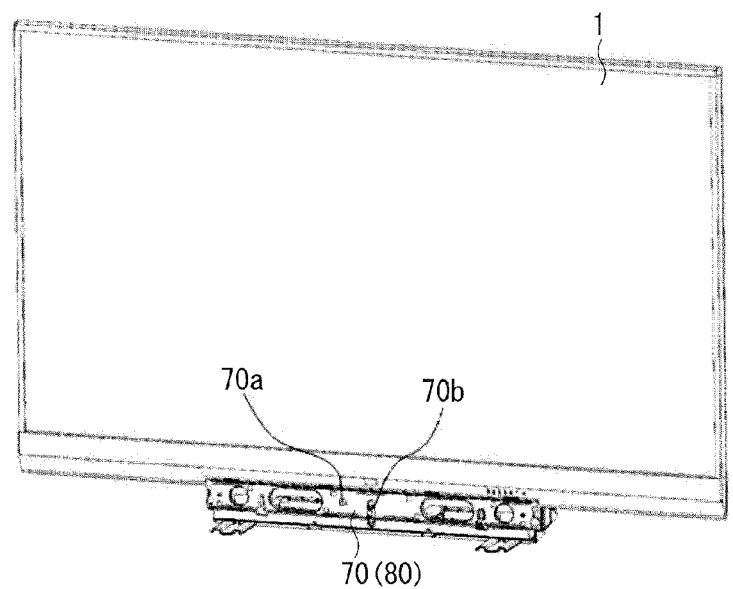
F I G. 2 3
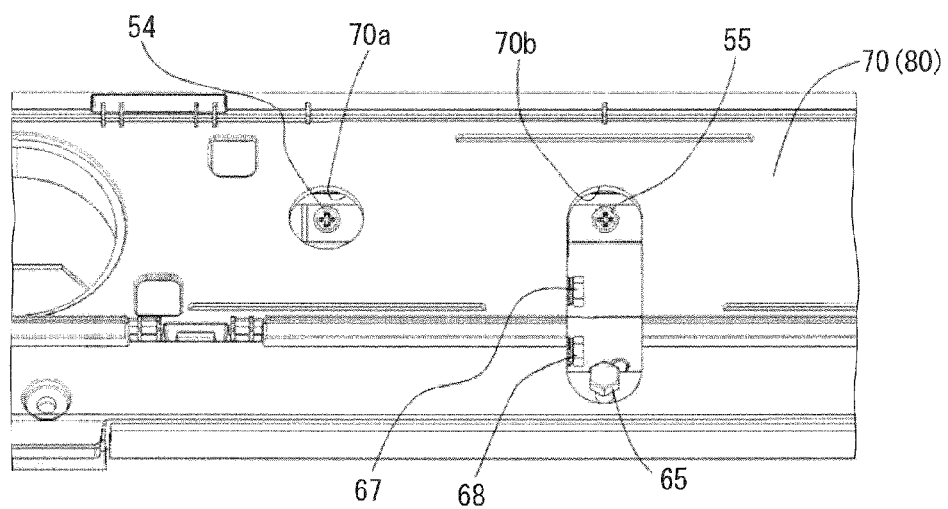

VIDEO PROJECTION DEVICE EASY FOR ADJUSTMENT WORK

BACKGROUND OF THE INVENTION

1. Field of the Invention

The present invention relates to video projection devices for displaying, on screens, videos having been magnified and projected by optical engines, and more particularly, relates to video projection devices with reduced thicknesses.

2. Description of the Background Art

Conventionally, in a video projection device including a screen provided in a cabinet in its front side and optical devices placed within the cabinet, in order to attain reduction of the thickness of the video projection device and reduction of its height, there have been employed a structure in which an optical engine, a first reflection optical device having a planar-shaped reflection surface for folding video light emitted from the optical engine to project it onto the screen, and a second reflection optical device having a reflection surface with a rotationally-symmetrical shape centered on an optical axis are placed on a video-light path, and they are housed within the cabinet in a compact manner.

For example, Japanese Patent Application Laid-Open No. 2011-7940 discloses a video projection device having a structure in which, on a video-light path, a top plate mirror, a non-spherical mirror and a folding mirror for folding the optical path are placed within a cabinet. Further, the device described in Japanese Patent Application Laid-Open No. 2011-7940 is structured such that an optical engine incorporating the folding mirror and the non-spherical mirror is comprehensively held by a main frame which holds a screen, which prevents distortions induced in a bottom-frame side from being transferred to the main frame which holds the optical engine, thereby preventing the occurrence of distortions in images on the screen.

SUMMARY OF THE INVENTION

Such video projection devices may induce component-dimension variations in the main frame which holds the screen, and also may induce assembling variations in assembling the main frame. In such cases, the angle of the optical engine with respect to the screen surface is displaced or an imbalance between left and right sides of the main frame is induced, which induces screen-plane distortions at the lower left corner portion and the lower right corner portion on the screen having particularly higher sensitivity since there are longer optical paths thereto, thereby degrading the resolution (hereinafter, referred to as focusing). Further, in the event that the installation of the components which hold the folding mirror incorporated in the optical engine is deviated in leftward and rightward rotational directions, the focusing is degraded at portions of the lower left corner portion and the lower right corner potion of the screen.

In the event of screen-plane distortions or focusing degradations, in order to adjust the non-spherical mirror and a projection-lens portion incorporated in the optical engine, it is necessary to disengage the bottom frame at a back portion of the cabinet, thereby inducing the problem of time-consuming work for attaching and detaching the bottom frame. Further, since the folding mirror is installed near the back surface of the screen, it is necessary to disengage the bottom frame at the cabinet back portion and the optical engine incorporating the folding mirror, then perform adjustments using additional projection tools and, thereafter, mount the optical engine to the main frame, again. This has made it impossible to perform adjustment works with ease.

It is an object of the present invention to provide a video projection device capable of easily performing works for adjusting optical components, in the event of occurrences of focusing degradation or screen-plane distortions in videos on a screen.

A video projection device according to the present invention includes: an optical engine for emitting video light; a projection lens adapted to project the video light emitted from the optical engine; a first reflection optical device adapted to reflect the video light projected by the projection lens, in a predetermined direction, on a reflection surface having a planar shape; a second reflection optical device adapted to reflect the video light reflected by the first reflection optical device, in a predetermined direction, on a reflection surface having a rotationally-symmetrical shape centered on an optical axis; a screen adapted to display the video light reflected by the second reflection optical device; and a cabinet adapted to cover a lower surface and a back surface of the screen. The projection lens and the second reflection optical device are placed at an approximate center in leftward and rightward directions of the screen and in a back portion in the cabinet. The first reflection optical device is placed at an approximate center in leftward and rightward directions of the screen and at a front portion in the cabinet. The video projection device further includes a coupling member adapted to integrally couple the projection lens, the first reflection optical device and the second reflection optical device to each other to form a projection unit.

According to the present invention, the projection lens and the second reflection optical device are placed at the back portion in the cabinet, and the first reflection optical device is placed at the front portion in the cabinet, which enables works for adjusting the projection lens, the first reflection optical device and the second reflection optical device to be easily performed from the outside, in the event of occurrences of focusing degradation or screen-plane distortions in videos on the screen.

Further, the projection lens, the first reflection optical device and the second reflection optical device are placed at an approximate center in the leftward and rightward directions of the screen, and they are integrally coupled to each other by the coupling member. Therefore, when there is a need for adjusting the projection unit, it is possible to adjust the projection unit in a fine balance between left and right sides from the outside, in a state where the rigidity thereof is ensured by the coupling member.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a rear perspective view illustrating the video projection device, in a state where a cabinet design structural member is mounted thereto;

FIG. 10 is a rear perspective view illustrating the video projection device, in a state where a cover member is mounted thereto;

FIG. 15 is a rear perspective view illustrating the reflection mirror unit in a state where it is combined with a reflection-mirror-unit holding member;

FIG. 16 is a rear perspective view illustrating the reflection mirror unit in a state where it is fixed to the reflection-mirror-unit holding member through a screw;

FIG. 22 is a perspective view illustrating the video projection device in a state where a front design member has been removed therefrom; and FIG. 23 is a main-portion enlarged front view illustrating the video projection device in a state where the front design member has been removed therefrom.

DESCRIPTION OF THE PREFERRED EMBODIMENTS

Preferred Embodiments

Figure 1:
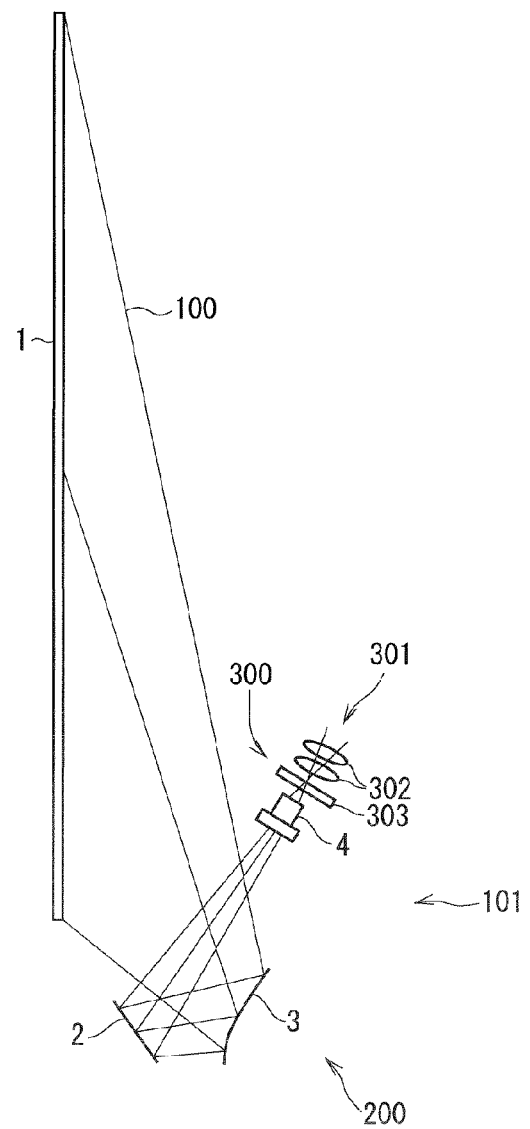
FIG. 1 is a schematic view illustrating an optical layout of a video projection device according to a preferred embodiment.

Hereinafter, a preferred embodiment of the present invention will be described with reference to the drawings. At first, an optical layout of a video projection device will be described. FIG. 1 is a schematic view illustrating an optical layout of a video projection device according to a preferred embodiment.

As illustrated in FIG. 1, the video projection device includes an illumination optical system 300, a projection optical system 200, and a screen 1. The illumination optical system 300 includes a light source portion 301, lenses 302, and an image display device 303. The projection optical system 200 includes a projection lens 4, a reflection mirror 2 (a first reflection optical device), and a non-spherical mirror 3 (a second reflection optical device). The light source portion 301 is constituted by a lamp light source, a laser light source, an LED light source, and the like. The lenses 302 are adapted to condense light emitted from the light source portion 301. The image display device 303, which is constituted by a liquid crystal device or a DMD (Digital Micromirror Device), for example, is adapted to reflect or pass light emitted from the lenses 302 to spatially modulate the light into video light and, further, is adapted to emit the video light.

The projection lens 4 magnifies the video light emitted from the image display device 303, and further projects the light. The reflection mirror 2 is adapted to reflect the video light projected by the projection lens 4, in a predetermined direction, on its planar-shaped reflection surface. The non-spherical mirror 3 is adapted to reflect the video light reflected by the reflection mirror 2, in a predetermined direction, on a reflection surface having a rotationally-symmetrical shape centered on an optical axis. The screen 1 displays the video light 100 reflected by the non-spherical mirror 3. Here, the lenses 302 and the image display device 303 which constitute the illumination optical system 300, and the projection optical system 200 constitute a projection unit 101.

Figure 2:
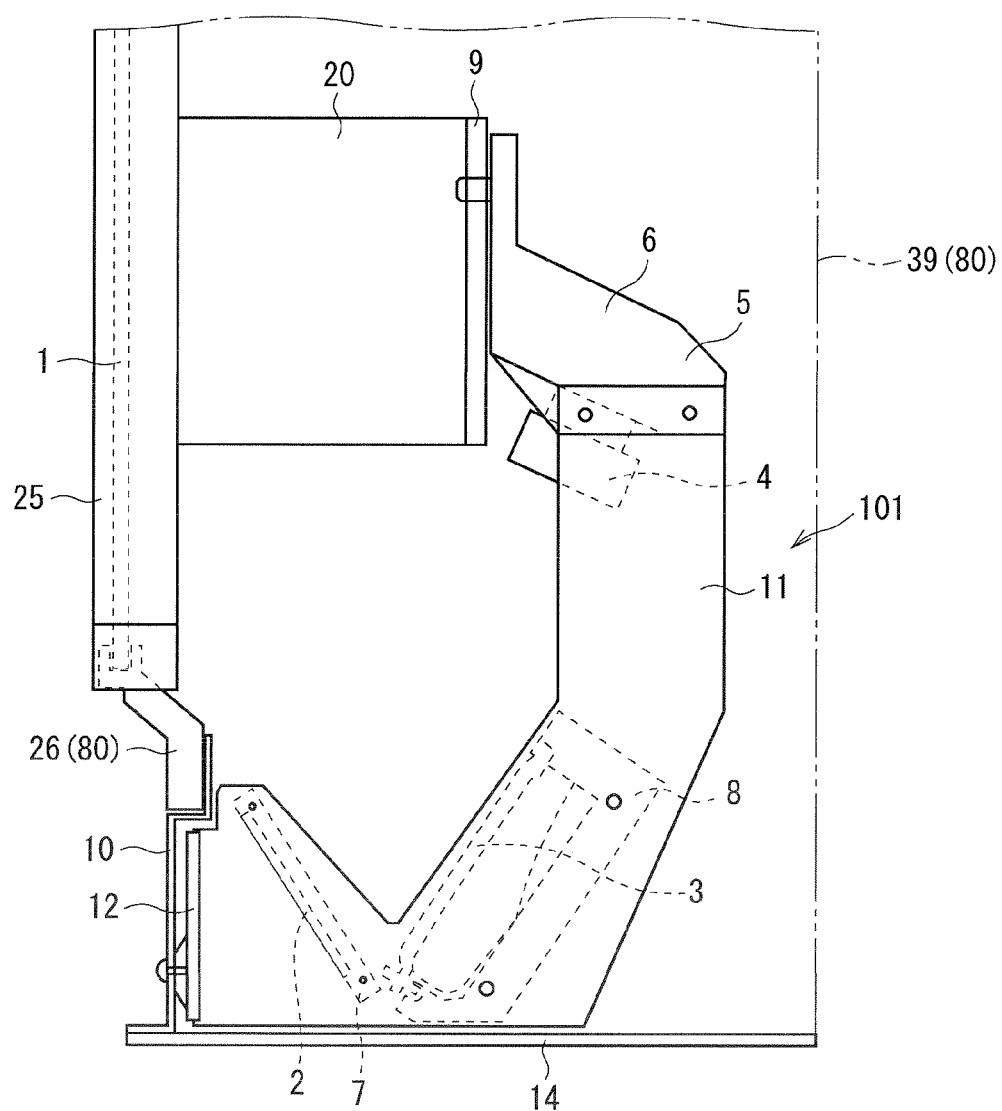
FIG. 2 is a side view illustrating the internal structure of main portions of the video projection device.
Figure 3:
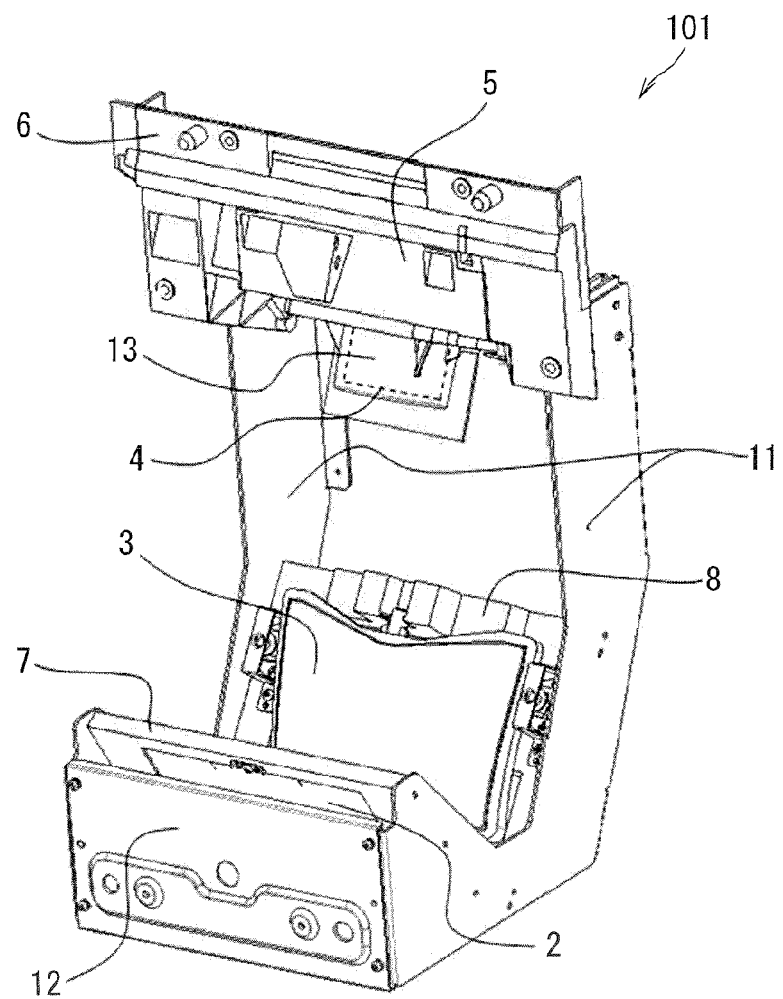
FIG. 3 is a perspective view of a projection unit.
Figure 4:
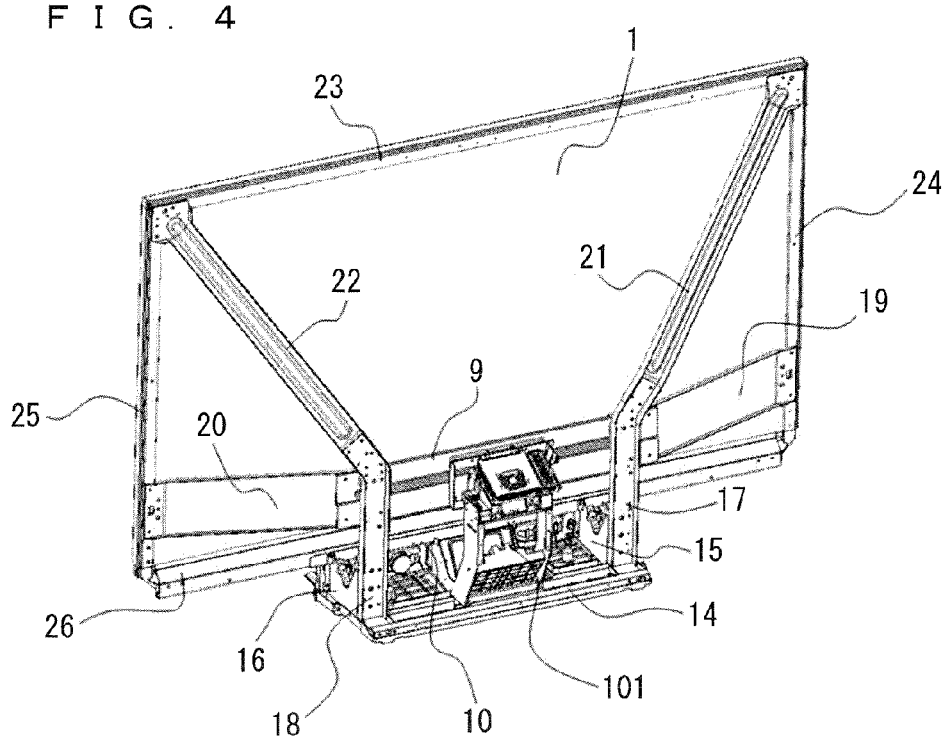
FIG. 4 is a rear perspective view illustrating the internal structure of the video projection device.

Next, the internal structure of the video projection device will be described. FIG. 2 is a side view illustrating the internal structure of main portions of the video projection device. FIG. 3 is a perspective view of the projection unit 101, and FIG. 4 is a rear perspective view illustrating the internal structure of the video projection device. As illustrated in FIG. 2, the video projection device includes a cabinet 80 which covers the lower surface and the back surface of the screen 1, and a pair of projection-unit structural members 11 (a coupling member) which couple the projection lens 4, the reflection mirror 2 and the non-spherical mirror 3 integrally with each other for forming the projection unit 101, in addition to the structures described with reference to FIG. 1. Note that, when FIG. 2 is viewed by facing toward the paper plane, the leftward direction is defined as a forward direction, while the rightward direction is defined as a backward direction.

An optical engine 5 is placed at a back portion in the cabinet 80 and is held by an optical-engine base member 6. Further, the optical engine 5 incorporates the projection lens 4. Here, the optical engine 5 is a component corresponding to the lenses 302 and the image display device 303, in the illumination optical system 300 illustrated in FIG. 1. The non-spherical mirror 3 is placed at a back and lower portion in the cabinet 80 and is held by a non-spherical-mirror holding member 8. The reflection mirror 2 is placed at a front portion in the cabinet 80 and below the screen 1, and is held by a reflection-mirror holding member 7.

The optical-engine base member 6 is a reinforcing structural member for the optical engine 5. As illustrated in FIG. 2, FIG. 3 and FIG. 4, left and right end portions (left and right end sides) of the optical-engine base member 6, left and right ends (left and right end sides) of the non-spherical-mirror holding member 8, and left and right ends (left and right end sides) of the reflection-mirror holding member 7 are integrally coupled to each other through the pair of the projection-unit structural members 11, and the projection unit 101 is thereby structured. The projection unit 101 is placed at a lower portion in the cabinet 80 at a center portion thereof in the leftward and rightward directions. The pair of the projection-unit structural members 11 are sheet-metal pressed members with excellent dimension accuracy, which can ensure higher accuracy of the positions at which there are placed the optical-engine base member 6, the non-sphericalmirror holding member 8, and the reflection-mirror holding member 7 in the projection unit 101.

Further, the projection lens 4, the non-spherical mirror 3 and the reflection mirror 2 are placed such that their centers in the leftward and rightward directions are coincident with an approximate center of the screen 1 in the leftward and rightward directions, and therefore the pair of the projection-unit structural members 11 can couple the optical-engine base member 6, the non-spherical-mirror holding member 8 and the reflection-mirror holding member 7 to each other at their left and right end sides, in an excellent balance. A projection-unit structural member 12 couples the pair of the projection-unit structural members 11 to each other at their front ends, thereby ensuring a high strength of the projection unit 101.

As illustrated in FIG. 2, the optical-engine base member 6 is fixed to a rear-portion structural member 9 (a back-portion structural member) which holds the screen 1 at its back side, and the projection-unit structural member 12 is fixed to a front-portion structural member 10 (a front-portion structural member) which holds the screen 1 at its lower side. There is provided a gap between the projection unit 101 and a television base portion 14 for installing the video projection device on a floor surface, which prevents external forces caused by the deformation of the television base portion 14 from being directly transmitted to the projection unit 101, thereby preventing the occurrence of image distortions in videos on the screen 1, even when the video projection device is installed on a floor surface with a level difference.

Next, with reference to FIG. 4, there will be described a cabinet frame structure for holding the screen 1. The front-portion structural member 10 is fixed to a front end portion of the television base portion 14, and frame members 17 and 18 are fixed to a back end portion of the television base portion 14. Holding members 15 and 16 couple the front-portion structural member 10 and the frame members 17 and 18 to each other. The frame members 17 and 18 support the rear-portion structural member 9. The rear-portion structural portion 9 is fixed at its one end portion to the frame member 19, and is fixed at the other end thereof to a frame member 20.

Further, a frame member 22 is fixed at its one end portion to the frame member 18, and is fixed at the other end portion thereof to an upper right corner portion of the screen 1. A frame member 21 is fixed at its one end portion to the frame member 17, and is fixed at the other end portion thereof to an upper left corner portion of the screen 1. The screen 1 is held by screen holding members 23, 24, 25 and 26, and is supported by the front-portion structural member 10, the frame members 19 and 20 and the frame members 21 and 22.

Figure 5:
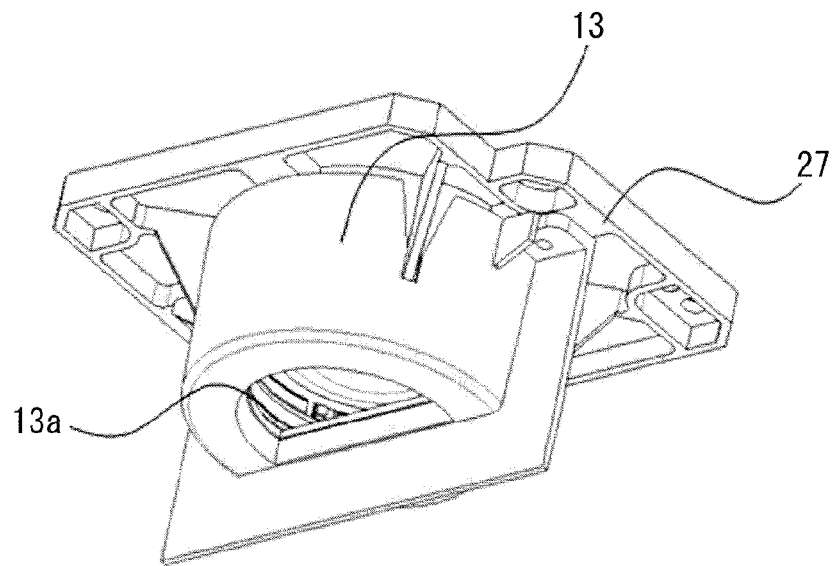
FIG. 5 is a perspective view illustrating an adjustment structure for a projection lens.
Figure 6:
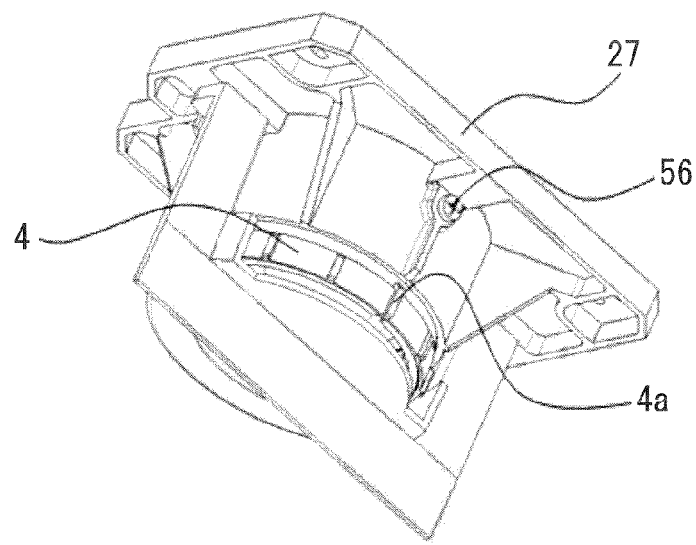
FIG. 6 is a perspective view illustrating the adjustment structure for the projection lens when it is viewed in a different direction.

Next, with reference to FIG. 5 and FIG. 6, there will be described an adjustment structure for the projection lens 4. FIG. 5 is a perspective view illustrating the adjustment structure for the projection lens 4, and FIG. 6 is a perspective view illustrating the adjustment structure for the projection lens 4 when it is viewed in a different direction. As illustrated in FIG. 5 and FIG. 6, the adjustment structure for the projection lens 4 includes the projection lens 4, a projection-lens base member 27, a projection-lens cover 13 and adjustment rib portions 4a (a first adjustment portion). The projection lens 4 is held by the projection-lens base member 27, and the projection-lens cover 13 is fixed to the projection-lens base member 27. The projection-lens cover 13 is provided with an opening portion 13a, which allows only necessary video light to be emitted from the projection lens 4 through the opening portion 13a.

The projection lens 4 is provided with adjustment rib portions 4a at even intervals, and therefore is structured to be easily grasped by a tool or the like from the outside. By rotating the adjustment rib portions 4a using a tool or the like, the projection lens 4 moves along an optical axis with respect to the projection-lens base member 27, which enables the adjustment of the focus level of videos on the screen 1. After the adjustment, a fastening screw 56 is fixed to the projection-lens base member 27, so that the projection lens 4 is fixed to the projection-lens base member 27.

Figure 7:
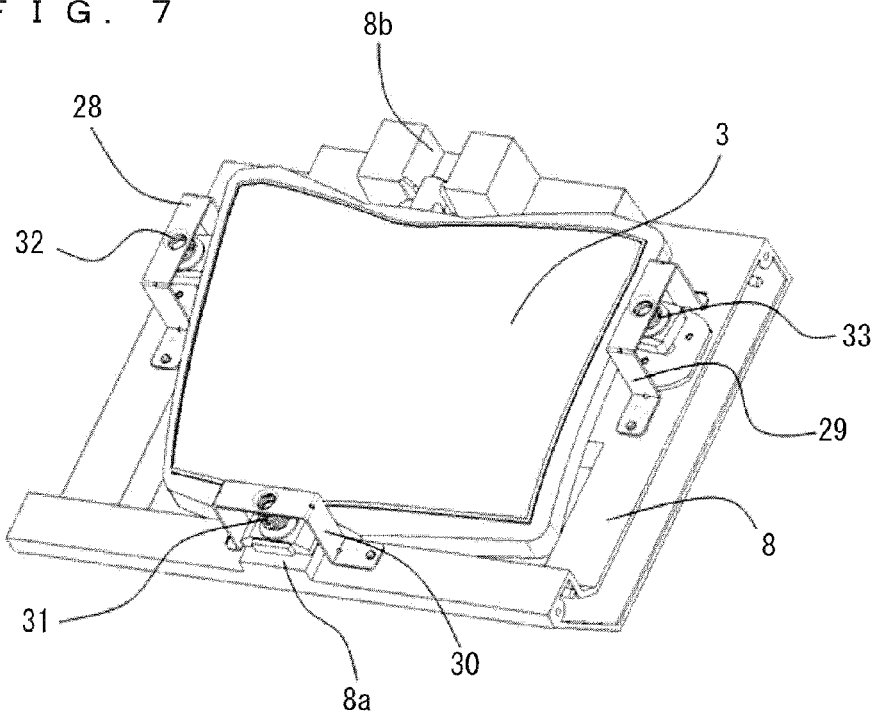
FIG. 7 is a perspective view illustrating an adjustment structure for a non-spherical mirror.
Figure 8:
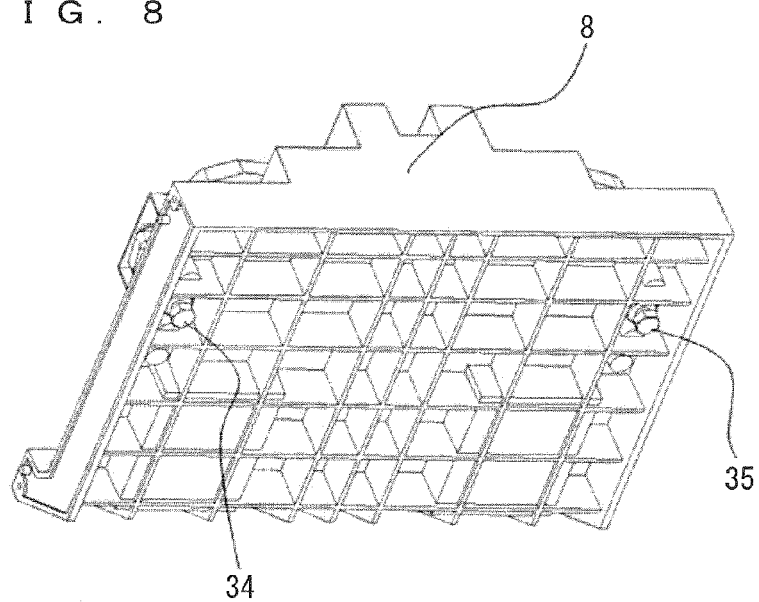
FIG. 8 is a rear perspective view illustrating the adjustment structure for the non-spherical mirror.

Next, with reference to FIG. 7 and FIG. 8, there will be described an adjustment structure for the non-spherical mirror 3. FIG. 7 is a perspective view illustrating the adjustment structure for the non-spherical mirror 3, and FIG. 8 is a rear perspective view illustrating the adjustment structure for the non-spherical mirror 3. As illustrated in FIG. 7 and FIG. 8, the adjustment structure for the non-spherical mirror 3 includes the non-spherical mirror 3, a non-spherical-mirror holding member 8, a non-spherical-mirror pivot-shaped holding portion 8a, springs 31, 32 and 33, adjustment screws 34 and 36 serving as a second adjustment portion, and spring-pressing members 28, 29 and 30.

The non-spherical mirror 3 is placed such that its front end portion is in contact with the tip end surface of the non-spherical-mirror pivot-shaped holding portion 8a in the non-spherical-mirror holding member 8. Further, the non-spherical mirror 3 is placed such that its left and right end portions are in contact with the tip end surfaces of the adjustment screws 34 and 35 incorporated in the non-spherical-mirror holding member 8. The non-spherical mirror 3 is placed such that its back end portion is inserted in a non-spherical-mirror guide-shaped holding portion 8b in the non-spherical-mirror holding member 8. The non-spherical mirror 3 is restrained, at its front end portion and its left and right end portions, from moving forwardly beyond the spring-pressing members 28, 29 and 30, by the spring-pressing members 28, 29 and 30 fixed to the non-spherical-mirror holding member 8 with the springs 31, 32 and 33 interposed therebetween.

Further, the non-spherical-mirror holding member 8 can be formed from a die-cast article made of aluminum, magnesium and the like or a shaped article made of a resin or the like.

With the adjustment structure for the non-spherical mirror 3, by rotating the adjustment screws 34 and 35 in the clockwise or counterclockwise direction such that the pivot portion of the non-spherical-mirror pivot-shaped holding portion 8a serves as a fulcrum, the installed portions of the adjustment screws 34 and 35 moves forwardly or backwardly, which changes the angle of the non-spherical mirror 3 with respect to the non-spherical-mirror holding member 8, thereby enabling adjustments of image distortions in videos on the screen 1. This enables the corrections of the positions of videos at upper left and right corner portions of the screen 1 to which there are longer optical paths, particularly.

Figure 11:
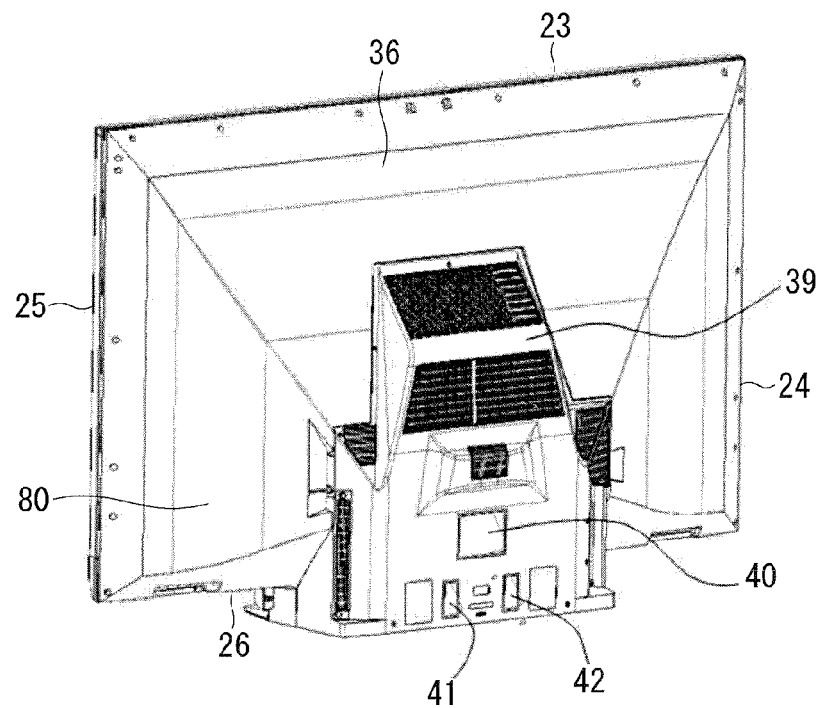
FIG. 11 is a rear perspective view illustrating the video projection device, in a state where a back cover is mounted thereto.
Figure 12:
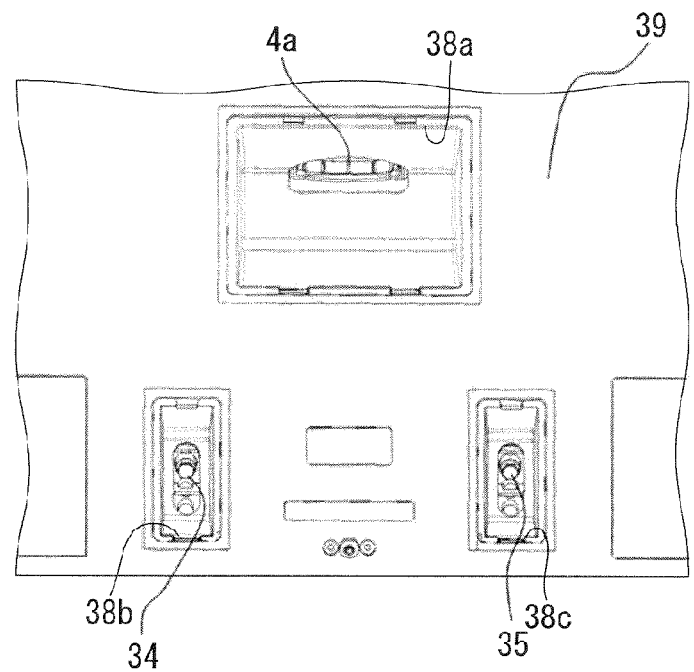
FIG. 12 is a main-portion enlarged rear view illustrating the video projection device, in a state where lid members have been removed therefrom.

Next, with reference to FIGS. 9 to 12, there will be described a structure in which the adjustment portions for the projection lens 4 and the non-spherical lens 3 are exposed. FIG. 9 is a rear perspective view illustrating the video projection device, in a state where a cabinet design structural member 36 is mounted therein. FIG. 10 is a rear perspective view illustrating the video projection device, in a state where a cover member 38 is mounted therein. FIG. 11 is a rear perspective view illustrating the video projection device, in a state where a back cover 39 is mounted therein. FIG. 12 is a main-portion enlarged rear view illustrating the video projection device, in a state where lid members 40, 41 and 42 have been removed therefrom.

As illustrated in FIGS. 9 to 12, the structure in which the adjustment portions for the projection lens 4 and the non-spherical lens 3 are exposed is a structure having opening portions 38a, 38b and 38c in a back portion of the cabinet 80.

Here, the cabinet 80 is constituted by the screen holding members 23, 24, 25 and 26, the cabinet design structural member 36, a cabinet internal structural member 37, the cover member 38, the back cover 39, the lid members 40, 41 and 42, a front design member 69 (see FIG. 22), and a front design member 70 (see FIG. 23).

As illustrated in FIG. 9, the cabinet design structural member 36 is fixed to the screen holding members 23, 24, 25 and 26, and the cabinet internal structural member 37 is fixed to the cabinet design structural member 36. The cabinet internal structural member 37 is provided with an opening portion 37a at its center portion, and the projection unit 101 is placed in the opening portion 37a. The areas of the cabinet design structural member 36 and the cabinet internal structural member 37 except the opening portion 37a are shielded by the screen 1, the screen holding members 23, 24, 25 and 26, the cabinet design structural member 36 and the cabinet internal structural member 37, which can prevent intrusions of dusts into the video projection device from the outside. In the cabinet internal structural member 37, a chassis portion, the light source portion 30 and the like can be placed.

As illustrated in FIG. 10, the cover member 38 is installed behind the projection unit 101 and is fixed to the cabinet internal structural member 37, thereby forming a shield structure. The cover member 38 (a back portion of the cabinet 80) is provided with an opening portion 38a serving as a first opening portion for exposing the adjustment rib portions 4a in the projection lens 4, and opening portions 38b and 38c serving as a second opening portion for exposing the adjustment screws 34 and 35 for the non-spherical mirror 3. Here, the opening portion 38a is formed to have a size larger than that of the adjustment rib portion 4a. Further, the opening portions 38b and 38c are formed to have sizes larger than those of the adjustment screws 34 and 35.

As illustrated in FIG. 11, the back cover 39 is mounted to the cabinet internal structural member 37 and is adapted to cover the chassis portion, the light source portion 301 and the projection unit 101. The lid member 40 for closing the opening portion 39a, and the lid members 41 and 42 for closing the opening portions 38b and 38c are mounted to the back cover 39. The lid members 40, 41 and 42 can be easily disengaged therefrom from the outside, which enables the adjustment of the adjustment rib portions 4a and the adjustment screws 34 and 35 from the outside, as illustrated in FIG. 12.

Figure 13:
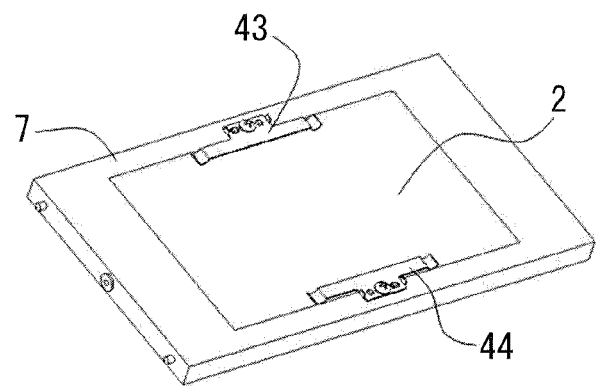
FIG. 13 is a perspective view illustrating a state where a reflection mirror is held by a reflection-mirror holding member.

Next, there will be described a holding structure for the reflection mirror 2. At first, there will be described a case where an adjustment structure has not been introduced therein. FIG. 13 is a perspective view illustrating a state where the reflection mirror 2 is held by the reflection-mirror holding member 7. As illustrated in FIG. 13, the reflection mirror 2 is installed inside the reflection-mirror holding member 7 and is held by pressing members 43 and 44. Note that the reflection-mirror holding member 7 can be formed from a die-cast article made of aluminum, magnesium and the like or formed from a cut article made of aluminum or the like. As illustrated in FIG. 3, the reflection-mirror holding member 7 is fixed, at its left and right ends, to the pair of the projection-unit structural members 11, by being sandwiched therebetween.

In the case where the reflection mirror 2 is mounted to the reflection-mirror holding member 7 on the tilt with respect to the reflection-mirror holding member 7 or in the case where the reflection mirror 2 is inclined due to variations of the dimension accuracy of the reflection-mirror holding member 7, the focusing is particularly degraded at the upper left and right portions of the screen 1 to which there are longer optical paths, thereby degrading the focusing balance between the left and right sides. Further, in the event of the occurrence of member-dimension variations or assembling variations in the frame members 19, 20, 21 and 22 which hold the screen 1, the projection unit 101 may be mounted in the state where it is inclined with respect to the surface of the screen 1 in a leftwardly and rightwardly unbalanced manner, which may degrade focusing at the upper left and right portions of the screen 1 to which there are longer optical paths, in particular, thereby degrading the focus balance between left and right sides.

Figure 14:
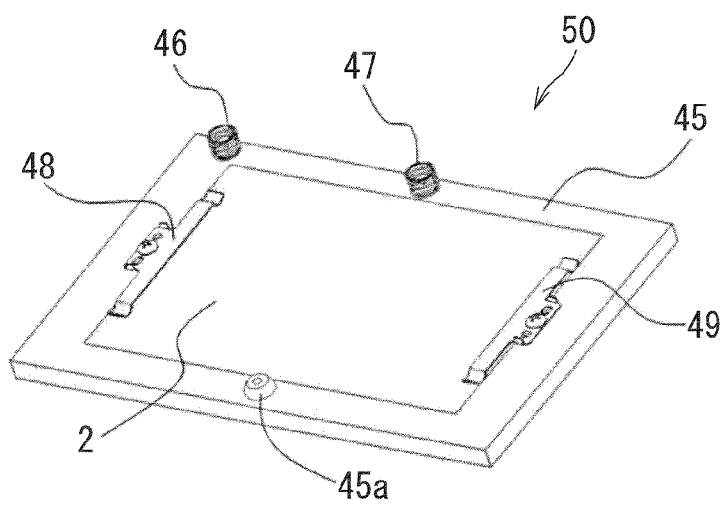
FIG. 14 is a perspective view of a reflection mirror unit.
Figure 17:
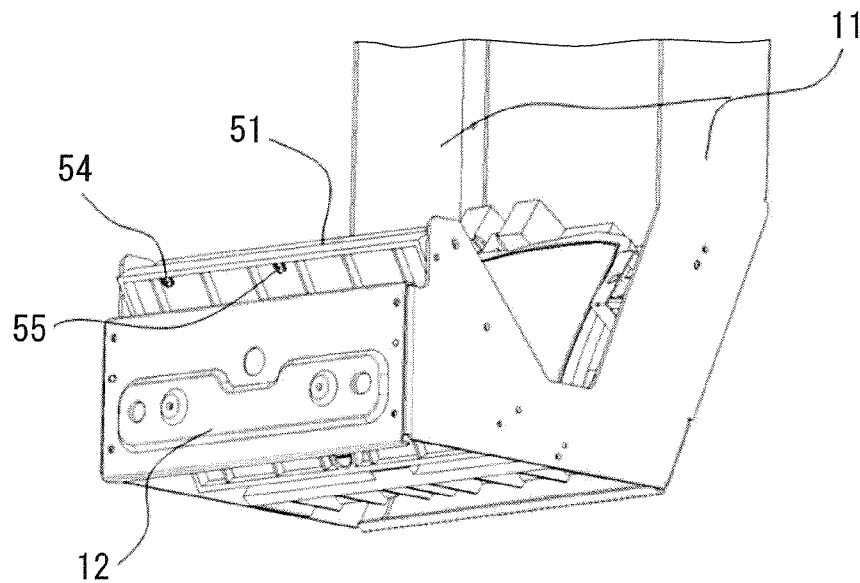
FIG. 17 is a main-portion enlarged perspective view of the projection unit.

Next, with reference to FIGS. 14 to 17, there will be described a case where the adjustment structure is introduced in the reflection mirror 2. FIG. 14 is a perspective view of a reflection mirror unit 50. FIG. 15 is a rear perspective view illustrating a state where the reflection mirror unit 50 is combined with a reflection-mirror-unit holding member 51. FIG. 16 is a rear perspective view illustrating a state where the reflection mirror unit 50 is fixed to the reflection-mirror-unit holding member 51 through a screw 53. FIG. 17 is a main-portion enlarged perspective view of the projection unit 101.

The adjustment structure for the reflection mirror 2 includes the reflection mirror 2, a reflection-mirror holding member 45, a pivot-shaped portion 45a, springs 46 and 47, pressing members 48 and 49, the reflection-mirror-unit holding member 51, adjustment screws 54 and 55 serving as a third adjustment portion. The reflection mirror 2 is held by the pressing members 48 and 49 in a state where it is installed inside the reflection-mirror holding member 45, thereby forming the reflection mirror unit 50. The springs 46 and 47 are mounted to the reflection-mirror holding member 45 at positions closer to its one end portion than the position at which the reflection mirror 2 is installed. Further, the pivot-shaped portion 45a is provided in the reflection-mirror holding member 45 at a position closer to the other end portion thereof than the position at which the reflection mirror 2 is installed.

Next, there will be described the reflection-mirror-unit holding member 51 combined with the reflection-mirror holding member 45. As illustrated in FIG. 15 and FIG. 16, the reflection-mirror-unit holding member 51 is provided with a pivot-shaped holding portion 51a, at a position which aligns with the pivot-shaped portion 45a of the reflection-mirror holding member 45. The reflection-mirror-unit holding member 51 is combined with the reflection-mirror unit 50, in a state where the pivot-shaped holding portion 51a and the pivot-shaped portion 45a are fitted with each other. In the state where the reflection-mirror-unit holding member 51 and the reflection-mirror unit 50 are combined with each other, a spring 52 is inserted in the pivot-shaped holding portion 51a and is fixed thereto through a screw 53. Further, the adjustment screws 54 and 55 are inserted through the reflection-mirror-unit holding member 51 and the reflection-mirror holding member 45. Note that the reflection-mirror-unit holding member 51 can be formed from a die-cast article made of aluminum, magnesium and the like or can be formed from a shaped article made of a resin or the like.

As illustrated in FIG. 17, the reflection-mirror-unit holding member 51 is fixed, at its left and right end portions, to the pair of the projection-unit structural members 11, by being sandwiched therebetween. By rotating the adjustment screws 54 and 55 in the clockwise or counterclockwise direction, the reflection mirror unit 50 is inclined such that the pivot-shaped holding portion 51a in the reflection-mirror-unit holding member 51 serves as a fulcrum, which changes the reflection angle mirror 2 with respect to the reflection-mirror-unit holding member 51, thereby enabling adjustments of the focus levels at the upper left and right corner portions of the screen 1 to which there are longer optical paths, particularly.

Next, there will be described an adjustment structure for the projection unit 101. At first, there will be described the necessity of adjustments of the projection angle unit 101. In the event of the occurrence of assembling variations or member-dimension variations in the frame members 21 and 22 illustrated in FIG. 4, the screen 1 tends to tilt in the forward direction or tends to tilt in the rearward direction, at its upper portion. In such cases, the angle between the vertical surface of the screen 1 and video light from the projection unit 101 is deviated. In the event of the occurrence of focus unbalance at the upper left and right corner portions of the screen 1 due to unbalance between left and right sides, if the angle between the vertical surface of the screen 1 and video light from the projection unit 101 is deviated, focusing at an upper corner potion of the screen 1 in one side is further degraded. In order to overcome such a problem, it is necessary to perform adjustments of the projection angle unit 101.

Next, with reference to FIGS. 18, 19 and 20, there will be described a case where the adjustment structure has been introduced in the projection unit 101. Further, in FIG. 2, the adjustment structure for the projection unit 101 has not been introduced, but the position at which the projection unit 101 is installed within the cabinet 80 is the same as that in the case where the adjustment structure for the projection unit 101 has been introduced therein, and therefore references will be properly made to FIG. 2 for the description.

Figure 18:
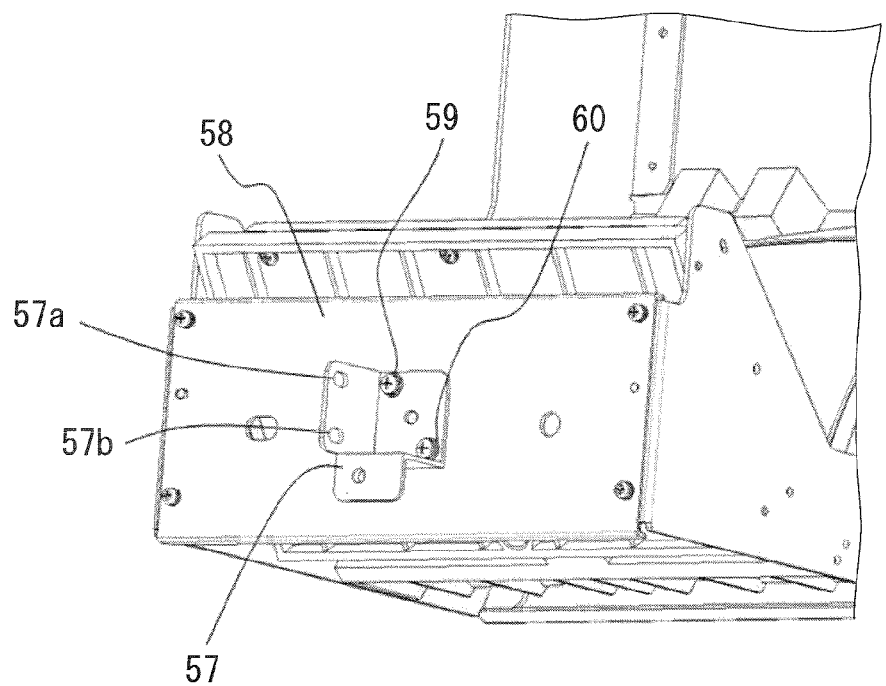
FIG. 18 is a main-portion enlarged perspective view of the projection unit in a case where an adjustment structure is introduced therein.
Figure 19:
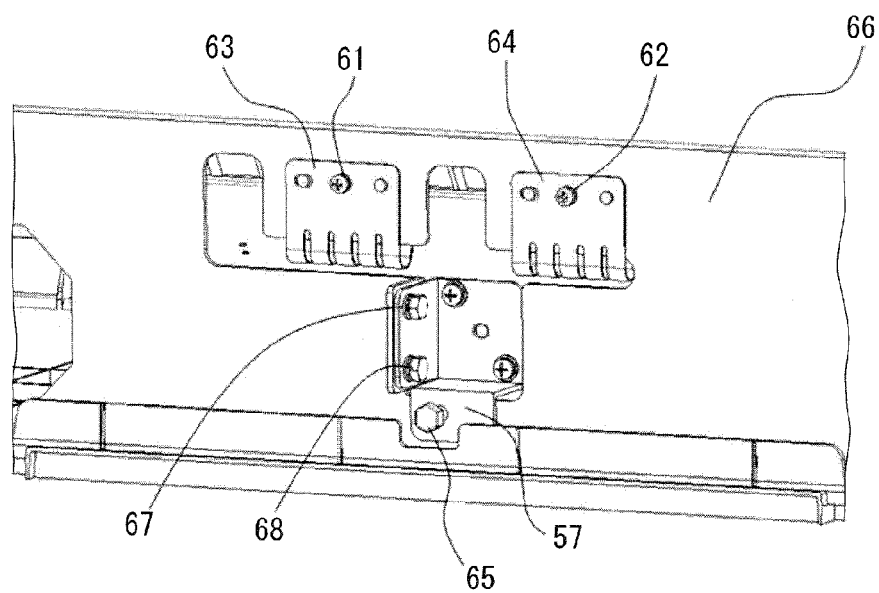
FIG. 19 is a main-portion enlarged perspective view illustrating a state where the projection unit is fixed to a front-portion structural member, in the case where the adjustment structure is introduced therein.

As illustrated in FIG. 18 and FIG. 19, the adjustment structure for the projection unit 101 includes a coupling member 57, an adjustment screw 65, and flat springs 63 and 64 having a substantially U shape. The coupling member 57 is fixed to a center portion of a projection-unit structural member 58 through screws 59 and 60. The coupling member 57 is provided with two long-hole portions 57a and 57b.

Figure 20:
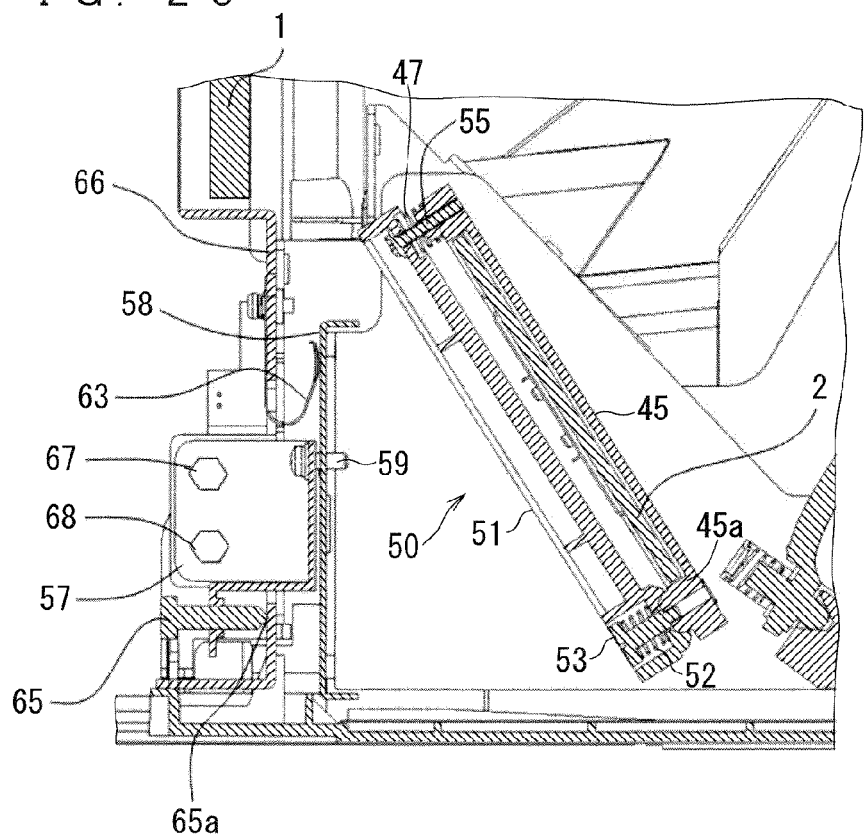
FIG. 20 is a cross-sectional view illustrating a state where the projection unit is fixed to the front-portion structural member, in the case where the adjustment structure is introduced therein.

As illustrated in FIG. 19 and FIG. 20, the flat spring 63 is fixed, at its one end portion, to a front-portion structural member 66 through a screw 61, and the flat spring 63 bent backwardly is pressed, at the other end portion thereof, against the surface of the projection-unit structural member 58. The flat spring 64 is fixed, at its one end portion, to the front-portion structural member 66 through a screw 62, and the flat spring 64 bent backwardly is pressed, at the other end portion thereof, against the surface of the projection-unit structural member 58. Further, the adjustment screw 65 is mounted to the coupling member 57 such that it is movable forwardly and backwardly with respect to the coupling member 57, and screws 67 and 68 are fixed to the front-portion structural member 66 through the long-hole portions 57a and 57b in the coupling member 57. Therefore, in a state where the screws 67 and 68 are loosened, the projection unit 101 is allowed to move forwardly and backwardly through the long-hole portions 57a and 57b.

As illustrated in FIG. 20, the adjustment screw 65 is in contact, at its tip end 65a, with the surface of the front-portion structural member 66, and the flat springs 63 and 64 are pressed, at their other end portions, against the surface of the projection-unit structural member 58, which continuously exerts a force for backwardly moving the lower portion of the projection unit 101. The movement of the projection unit 101 in the backward direction is restricted by the adjustment screw 65, so that the projection unit 101 is at a standstill.

As illustrated in FIG. 20, in a state where the screws 67 and 68 are loosened, if the adjustment screw 65 is rotated in the clockwise direction, the coupling member 57 is drawn toward the head portion of the adjustment screw 65 due to the elastic forces of the flat springs 63 and 64, and further the lower portion of the projection unit 101 illustrated in FIG. 2 moves forwardly such that the vicinity of the portions of the optical-engine base member 6 and the rear-portion structural member 9 which are fixed to each other serves as a fulcrum, since the coupling member 57 is fixed to the projection-unit structural member 58. Further, if the adjustment screw 65 is rotated in the counterclockwise direction, the projection-unit structural member 58 to which the coupling member 57 is fixed moves rearwardly, due to the pressing forces of the flat springs 63 and 64. Namely, the lower portion of the projection unit 101 illustrated in FIG. 2 moves rearwardly such that the vicinity of the portions of the optical-engine base member 6 and the rear-portion structural member 9 which are fixed to each other serves as a fulcrum.

As described above, by rotating the adjustment screw 65 in the clockwise or counterclockwise direction, the lower portion of the projection unit 101 moves forwardly or rearwardly such that the vicinity of the portions of the optical-engine base member 6 and the rear-portion structural member 9 which are fixed to each other serves as a fulcrum. This enables the adjustment of the angle of video light from the projection unit 101 with respect to the vertical surface of the screen 1. Particularly, the screen 1 has higher sensitivity at its upper left and right corner portions to which there are particularly longer optical paths, and therefore it is possible to reduce the amount of movement of the lower portion of the projection unit 101 in the forward and backward directions, in adjusting the projection angle unit 101. The optical-engine base member 6, the reflection-mirror holding member 7 and the non-spherical-mirror holding member 8 are coupled to each other, at their opposite ends, through the projection-unit structural members 11 having excellent accuracy, which enables the adjustment of the projection angle unit 101 in an excellent balance between left and right sides, in a state where the rigidity thereof is fixed. After the adjustment of the projection angle unit 101, the screws 67 and 68 are fastened, thereby maintaining the projection unit 101 at the position, as illustrated in FIG. 19 and FIG. 20.

As illustrated in FIG. 2 and FIG. 20, the reflection mirror 2 is placed at a front portion within the cabinet 80 and under the screen 1, which enables the adjustment screws 54 and 55 to be easily adjusted, in front of the video projection device. Further, the adjustment screw 65 in the projection unit 101 is provided on the projection-unit structural member 58 positioned at a front portion in the cabinet 80 and under the screen 1, which enables the adjustment screw 65 to be easily adjusted, in front of the video projection device.

Figure 21:
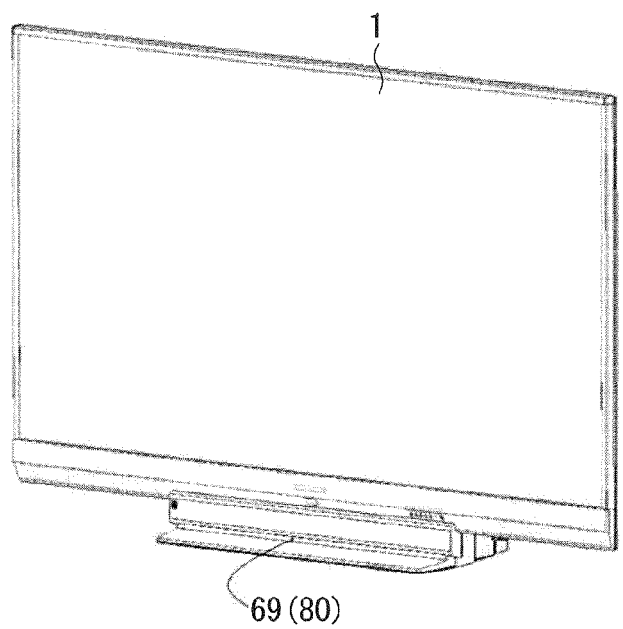
FIG. 21 is a perspective view of the video projection device.

Next, with reference to FIGS. 21, 22 and 23, there will be described a structure in which the adjustment portions for the reflection mirror 2 and the projection unit 101 are exposed. FIG. 21 is a perspective view of the video projection device. FIG. 22 is a main-portion enlarged front view illustrating the video projection device in a state where the front design member 69 has been removed therefrom. FIG. 23 is a main-portion enlarged front view illustrating the video projection device in a state where the front design member 69 has been removed therefrom.

As illustrated in FIGS. 21, 22 and 23, the structure in which the adjustment portions for the reflection mirror 2 and the projection unit 101 are exposed is a structure having opening portions 70a and 70b formed in a front portion of the cabinet 80. As illustrated in FIG. 21 and FIG. 22, in front of the projection unit 101, there is provided the front design member 70, and the front design member 69 is mounted in front of the front design member 70. In a state where the front design member 69 has been removed therefrom, the front surface of the front design member 70, which is positioned behind the front design member 69, is exposed. The front design member 70 (the front portion of the cabinet 80) is provided with the opening portions 70a and 70b.

As illustrated in FIG. 23, the opening portion 70a is formed to have a larger size than that of the adjustment screw 54, so that the adjustment screw 54 is exposed through the opening portion 70a. Further, the opening portion 70b is formed to have a larger size than that of the area in the projection unit 101 which extends from the adjustment screw 55 up to the adjustment screw 65, so that the adjustment screws 55 and 65 and the screws 67 and 68 are exposed through the opening portion 70b. The front design member 69 can be easily removed therefrom from the outside, and the adjustment screws 54 and 55 are exposed through the opening portions 70a and 70b in the front design member 70, which enables the adjustment screws 54 and 55 to be easily adjusted.

Further, the adjustment screw 65 is exposed through the opening portion 70b, which enables the adjustment screw 65 to be easily adjusted. Namely, it is possible to adjust the reflection angle mirror 2 and the projection angle unit 101 from the outside. Further, the screws 67 and 68 are also exposed through the opening portion 70b, which enables the screws 67 and 68 to be easily adjusted. After the adjustment of the projection angle unit 101, it is possible to fix the screws 67 and 68, in order to maintain the projection unit 101 at this position. In this case, the opening portion 70a and the opening portion 70b correspond to a third opening portion, and the opening portion 70b corresponds to a fourth opening portion. Note that although, in the present preferred embodiment, the opening portion 70b serves as both the third opening portion and the fourth opening portion, the fourth opening portion in which the screws 67 and 68 are exposed may be provided separately from the opening portion 70b.

As described above, in the video projection device according to the preferred embodiment, the projection lens 4 and the non-spherical mirror 3 are placed in a back portion within the cabinet 80, and the reflection mirror 2 is placed at a front portion within the cabinet 80. Accordingly, in the event of the occurrence of focusing degradation or image distortions in videos on the screen 1, it is possible to easily perform works for adjusting the projection lens 4, the reflection mirror 2 and the non-spherical mirror 3 from the outside.

Further, the projection lens 4, the reflection mirror 2 and the non-spherical mirror 3 are placed at an approximate center in the leftward and rightward directions of the screen 1, and they are integrally coupled to each other through the pair of the projection-unit structural members 11 serving as the coupling member, thereby forming the projection unit 101. Therefore, when there is a need for adjusting the projection unit 101, it is possible to adjust the projection unit 101 from the outside in a fine balance between left and right sides, in a state where the rigidity thereof is fixed through the pair of the projection-unit structural members 11.

Since the pair of the projection-unit structural members 11 fix the optical-engine base member 6, the reflection-mirror holding member 7 and the non-spherical-mirror holding member 8 at their left and right end sides, it is possible to increase the rigidity of the projection unit 101, thereby enabling adjustments of the projection unit 101 with higher accuracy.

Since the projection unit 101 is fixed to the rear-portion structural member 9 and the front-portion structural member 66 for holding the screen 1, it is possible to easily perform works for adjusting the projection unit 101 from the outside.

Since the projection lens 4 includes the adjustment rib portions 4a capable of adjusting the position thereof along the optical axis, and the cabinet 80 is provided, in its back portion, with the opening portion 38a for exposing the adjustment rib portions 4a, it is possible to easily adjust the adjustment rib portions 4a through the opening portion 38a.

Since there are provided the adjustment screws 34 and 35 which enable the adjustment of the reflection angle of video light by the non-spherical mirror 3 with respect to the screen 1, and the cabinet 80 is provided, in its back portion, with the opening portions 38b and 38c for exposing the adjustment screws 35 and 36, it is possible to easily adjust the adjustment screws 34 and 35 through the opening portions 38b and 38c.

Since there are provided the adjustment screws 54 and 55 which enable the adjustment of the reflection angle of video light by the reflection mirror 2 with respect to the non-spherical mirror 3, and the cabinet 80 is provided, in its front portion, with the opening portions 70a and 70b for exposing the adjustment screws 54 and 55, it is possible to easily adjust the adjustment screws 54 and 55 through the opening portions 70a and 70b.

Since there is provided the adjustment screw 65 which enables the adjustment of the projection angle of video light from the projection unit 101 with respect to the screen 1, and the cabinet 80 is provided, in its front portion, with the opening portion 70b for exposing the adjustment screw 65, it is possible to easily adjust the adjustment screw 65 through the opening portion 70b.

It is to be noted that in the present invention, it is possible to properly make changes and omissions to the preferred embodiment, without departing from the scope of the present invention.

While the invention has been shown and described in detail, the foregoing description is in all aspects illustrative and not restrictive. It is therefore understood that numerous modifications and variations can be devised without departing from the scope of the invention.

What is claimed is:

1. A video projection device comprising:
an optical engine for emitting video light;
a projection lens adapted to project said video light emitted from said optical engine;
a first reflection optical device held in a first holding member and adapted to reflect said video light projected by said projection lens, in a predetermined direction, on a reflection surface having a planar shape;
a second reflection optical device held in a second holding member and adapted to reflect said video light reflected by said first reflection optical device, in a predetermined direction, on a reflection surface having a rotationally-symmetrical shape centered on an optical axis;
a screen adapted to display said video light reflected by said second reflection optical device; and
a cabinet adapted to cover a lower surface and a back surface of said screen;
wherein said projection lens and said second reflection optical device are placed at an approximate center in leftward and rightward directions of said screen and in a back portion in said cabinet, and
said first reflection optical device is placed at an approximate center in leftward and rightward directions of said screen and at a front portion in said cabinet,
said video projection device further comprising a coupling member adapted to integrally couple said projection lens, said first reflection optical device and said second reflection optical device to each other to form a projection unit,
wherein said coupling member fixes the left and right sides of each of the first and second holding members from the perspective of said screen, wherein said first holding member fixes the left and right sides of said first reflection optical device from the perspective of said screen, and wherein said second holding member fixes the left and right sides of said second reflection optical device from the perspective of said screen.

2. The video projection device according to claim 1, further comprising a base member for holding said optical engine, said first holding member for holding said first reflection optical device, and said second holding member for holding said second reflection optical device, wherein said projection lens is incorporated in said optical engine, and said coupling member fixes said base member, said first holding member and said second holding member to each other, at their left and right end sides.

3. The video projection device according to claim 1, further comprising a front-portion structural member and a back-portion structural member for holding said screen, wherein said projection unit is fixed to said front-portion structural member and said back-portion structural member.

4. The video projection device according to claim 1, further comprising an adjustment portion capable of adjusting a position of said projection lens on an optical axis, wherein said cabinet is provided, in a back portion thereof, with a first opening portion for exposing said first adjustment portion.

5. The video projection device according to claim 1, further comprising an adjustment portion capable of adjusting a reflection angle of said video light by said second reflection optical device with respect to said screen, wherein said cabinet is provided, in a back portion thereof, with a second opening portion for exposing said second adjustment portion.

6. The video projection device according to claim 1, further comprising an adjustment portion capable of adjusting a reflection angle of said video light by said first reflection optical device with respect to said second reflection optical device, wherein said cabinet is provided, in a front portion thereof, with a third opening portion for exposing said third adjustment portion.

7. The video projection device according to claim 1, further comprising an adjustment portion capable of adjusting a projection angle of said video light by said projection unit with respect to said screen, wherein said cabinet is provided, in a front portion thereof, with a fourth opening portion for exposing said fourth adjustment portion.

* * * * *